United States Patent [19]
Constable

[11] 4,090,216
[45] May 16, 1978

[54] AMBIENT LIGHT CONTRAST AND COLOR CONTROL CIRCUIT

[75] Inventor: Douglas W. Constable, Batavia, N.Y.

[73] Assignee: GTE Sylvania Incorporated, Stamford, Conn.

[21] Appl. No.: 689,997

[22] Filed: May 26, 1976

[51] Int. Cl.² .......................................... H04N 9/535
[52] U.S. Cl. .................................... 358/21; 358/27; 358/39; 358/161
[58] Field of Search ................... 358/21, 27, 39, 161

[56] References Cited
U.S. PATENT DOCUMENTS

| 3,755,619 | 8/1973 | Lovezy et al. | 358/27 |
| 3,814,852 | 6/1974 | Mierzwinski | 358/27 X |
| 3,953,883 | 4/1976 | Grewe | 358/39 X |
| 3,983,575 | 9/1976 | Nagai et al. | 358/39 X |

Primary Examiner—Richard Murray
Attorney, Agent, or Firm—Norman J. O'Malley; Thomas H. Buffton; Robert T. Orner

[57] ABSTRACT

Contrast and color levels in a color television receiver are automatically varied with ambient light variations by an RC circuit AC coupling an ambient light responsive device to a luminance signal channel and DC coupling the ambient light responsive device to a DC potential source and a chrominance signal channel.

10 Claims, 3 Drawing Figures

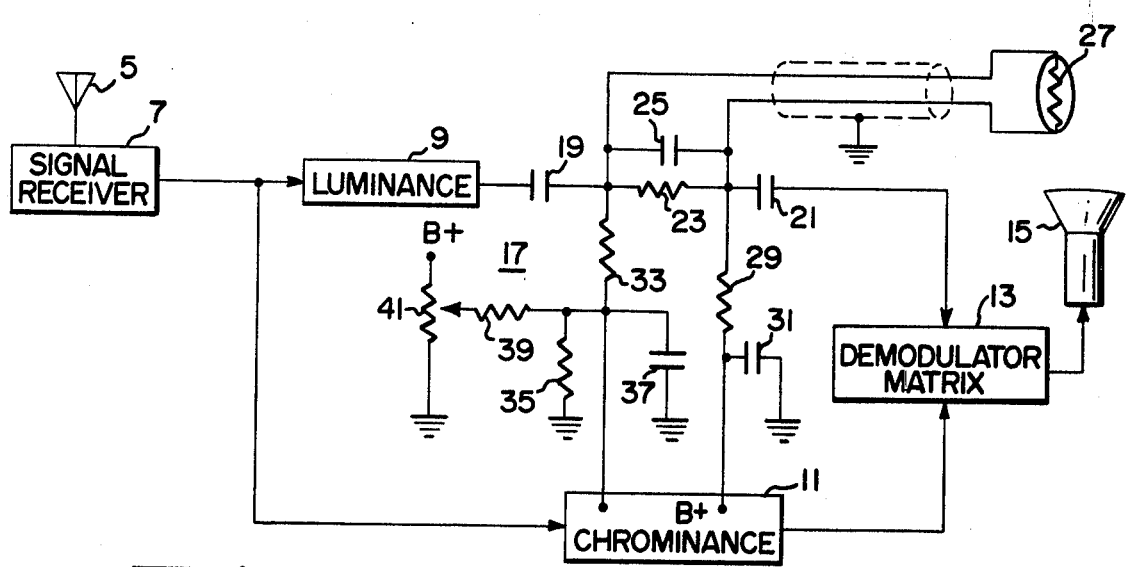
_Fig. 1_
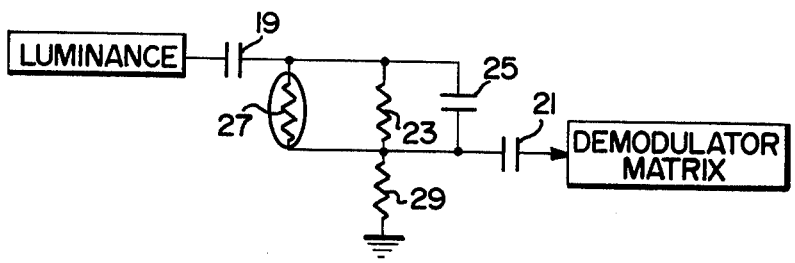
_Fig. 2_
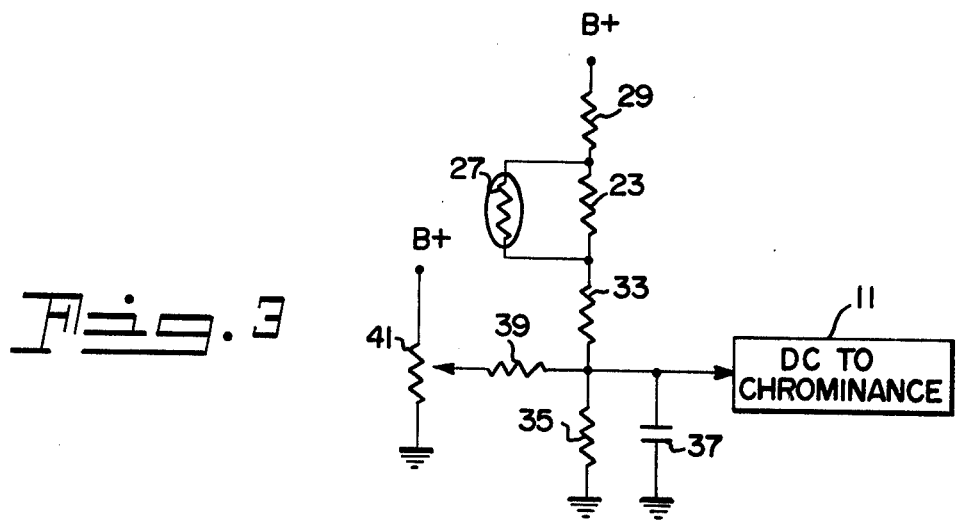
_Fig. 3_

AMBIENT LIGHT CONTRAST AND COLOR CONTROL CIRCUIT

BACKGROUND OF THE INVENTION

This invention relates to color television receivers and more particularly to circuitry responsive to changes in ambient light conditions to effect alterations in both contrast and color response of the color television receiver.

It is well known that picture quality of a television receiver varies as the ambient lighting conditions surrounding the television receiver vary. Thus, manual controls for both contrast affecting the luminance portion of a receiver signal and color affecting the chrominance portion of a receiver signal have long been available.

Also, automatic control of contrast and color responsive to variations in ambient lighting conditions is known. For example, one known automatic contrast and color control system for a color television receiver suggests a light responsive device disposed near the faceplate of a cathode ray tube and utilized to control both luminance and chrominance amplifiers of a color television. More specifically, the known circuitry employs an ambient light responsive device to effect amplification control of a chrominance signal channel and an optical isolator or light emitting diode in combination with a light dependent resistor to control the luminance signal channel of the receiver. Thus, isolation is achieved by independent light responsive devices.

OBJECTS AND SUMMARY OF THE INVENTION

An object of the present invention is to provide an enhanced color television receiver. Another object of the invention is to provide improved automatic ambient light contrast and color circuitry for a color television receiver. Still another object of the invention is to provide simplified circuitry including a single light responsive device for controlling contrast and color in a color television receiver.

These and other objects, advantages and capabilities are achieved in one aspect of the invention by an ambient light contrast and color control circuit wherein circuit means are provided for AC coupling an ambient light responsive device to a luminance signal channel to effect contrast variations and for DC coupling the same ambient light responsive device to a chrominance signal channel to effect color variations in a color television receiver.

BRIEF DESCRIPTION OF THE DRAWINGS

FIG. 1 is a block and schematic illustration of a color television receiver utilizing an embodiment of the invention;

FIG. 2 is an equivalent circuit illustrating the AC coupled luminance signal; and FIG. 3 is an equivalent circuit illustrating the DC coupled chrominance signal.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Referring to FIG. 1 of the drawings, a color television receiver includes an antenna 5 for intercepting transmitted color television signals and applying the intercepted signals to a signal receiver 7. The signal receiver 7 inclues the usual RF and IF amplifier and detector stages and provides output signals which are applied to a luminance signal channel 9 and to a chrominance signal channel 11. The outputs of the luminance and chrominance signal channels 9 and 11 are applied to a demodulator and matrix network 13 which is, in turn, coupled to a color cathode ray tube 15.

Also, an ambient light contrast and color control circuit 17 is coupled to the luminance and chrominance signal channels 9 and 11 of the above-described color television receiver. The ambient light contrast and color control circuit 17 includes first and second capacitors 19 and 21 coupled to the luminance signal channel 9 and demodulator and matrix network 13 respectively with a first resistor 23 interconnecting the first and second capacitors 19 and 21. A third capacitor 25 and an ambient light responsive device 27 are each shunted across the first resistor 23.

Further, the junction of the second capacitor 21 and first resistor 23 is coupled by a second resistor 29 to a DC potential source B+ which, in this instance is in the chrominance channel 11 although a separate DC potential source would be equally appropriate. A fourth capacitor 31 bypasses the chrominance B+ supply to ground. The junction of the first capacitor 19 and first resistor 23 is coupled by a third resistor 33 to the chrominance signal channel 11. A parallel connected fourth resistor 35 and fifth capacitor 37 couple the junction of the third resistor 33 and chrominance signal channel 11 to circuit ground. A fifth resistor 39 couples the fourth resistor 35 and fifth capacitor 37 to the adjustable arm of a variable resistor 41 connected intermediate a potential source B+ and circuit ground.

Referring to the equivalent circuit of FIG. 2, an AC or video signal available in the luminance signal channel is applied to a blocking capacitor 19 which is coupled to the shunt connected first resistor 23, third capacitor 25, and ambient light responsive device 27. The shunt connected first resistor 23, third capacitor 25, and light responsive device 27 are coupled by a second resistor 29 to a ground connection in so far as AC potentials are concerned and by a blocking capacitor 21 to an AC signal output terminal.

In operation, an AC or luminance input signal is transferred via the first and second blocking capacitors 19 and 21 to an AC signal output terminal. However, as the ambient light increases, the resistance of the light responsive device 27 decreases. Capacitor 25 is a small value capacitor which provides high frequency compensation for a shielded cable used to pss video to the light responsive device 27. Thus, the AC or video signal available at the output terminal increases to provide enhanced contrast at the cathode ray tube 15 of the color television receiver. Moreover, the second resistor 29 provides a load for the AC signal with respect to an AC ground. The AC ground is provided by capacitor 31 of FIG. 1. The first resistor 23 sets a minimum AC level irrespective of the ambient light responsive device 27.

As to the color control in the luminance signal channel, reference is made to the equivalent circuit of FIG. 3. Therein, a DC potential B+, available in the chrominance signal channel in this instance, is coupled by the series connected second resistor 29, first resistor 23, third resistor 33, and fourth resistor 35 to circuit ground. The ambient light responsive device 27 shunts the first resistor 23 while the fifth capacitor 37 shunts the fourth resistor 35. The junction of the third and fourth resistors 33 and 35 is coupled to the chrominance signal channel 11 and via a fifth resistor 39 to an adjustable resistor 41 serving as a color control adjustment.

In operation, a DC potential available from the DC potential source B+ is applied via the series connected resistors, 29, 23 and 33 respectively, to the chrominance signal channel 11 to provide a given chrominance signal level. However, this given chrominance signal level is altered in accordance with ambient light variations due to the change in impedance of the light responsive device 27. Thus, as the ambient light increases, the impedance of the light responsive device 27 is reduced and an increased DC potential is applied to the chrominance signal channel to effect an increase in the color signal.

Additionally, the third resistor 33 prevents the fifth capacitor 37 from shorting the luminance signal applied to the light responsive device 27 to circuit ground. On the other hand, the fifth capacitor 37 prevents an AC luminance signal from entering the chrominance signal channel 11 wherein a DC potential response is desired.

Thus, an ambient light responsive device is AC coupled to a luminance signal channel to the effect contrast control for changing ambient light conditions. Also, the same ambient light responsive device is DC coupled to a chrominance signal channel to effect color control in response to changing ambient light conditions.

As a result, there has been provided a unique and inexpensive circuit for controlling both contrast and color in accordance with ambient light conditions surrounding a color television receiver. The circuitry not only enhances the capabilities of the receiver but also achieves the result with a minimum of inexpensive components and circuitry.

While there has been shown and described what is at present considered a preferred embodiment of the invention, it will be obvious to those skilled in the art that various changes and modifications may be made therein without departing from the invention as defined by the appended claims.

What is claimed is:

1. In a color television receiver having luminance and chrominance signal channels and a DC potential source, an ambient light contrast and color control circuit comprising:
   an ambient light responsive device; and
   circuit means for AC coupling said ambient light responsive device in said luminance signal channel to effect signal contrast variations and DC coupling said ambient light responsive device to said DC potential source and to said chrominance signal channel to effect color signal variations in accordance with variations of said ambient light responsive device.

2. The ambient light contrast and color control circuit of claim 1 wherein said light responsive device is in the form of a light dependent resistor.

3. The ambient light contrast and color control circuit of claim 1 wherein said circuit means includes first and second capacitors coupling said ambient light responsive device in said luminance signal channel.

4. The ambient light contrast and color control circuit of claim 1 including a first impedance DC coupling said ambient light responsive device to said DC potential source and a second impedance DC coupling said ambient light responsive device in said chrominance signal channel.

5. The ambient light contrast and color control circuit of claim 4 wherein said first and second impedances are in the form of first and second resistors.

6. The ambient light contrast and color control circuit of claim 4 including a capacitor coupling said second impedance to a potential reference level whereby variations in AC luminance signal due to variations in said ambient light responsive device are shunted to circuit ground and do not alter said chrominance signal channel.

7. An ambient light contrast and color control circuit for a color television receiver comprising:
   a chrominance signal channel having a DC potential source and a given chroma signal level;
   a luminance signal channel having a given luminance signal level;
   an ambient light responsive device; and
   an RC circuit means DC coupling said ambient light responsive device to said DC potential source and in said chrominance signal channel to alter said given chroma signal level in accordance with alterations in said ambient light responsive device and AC coupling said ambient light responsive device in said luminance signal channel to effect alterations of said given luminance signal level in accordance with alterations in said ambient light responsive device.

8. The ambient light contrast and color control circuit of claim 7 wherein said RC circuit means includes first and second capacitors coupling said ambient light responsive device in said luminance signal channel of said color television receiver.

9. The ambient light contrast and color control circuit of claim 7 wherein said ambient light responsive device is in the form of a light dependent resistor.

10. The ambient light contrast and color control circuit of claim 7 wherein said ambient light responsive device is DC coupled by a first impedance to said DC potential source and DC coupled by a second impedance in said chrominance signal channel.

* * * * *